United States Patent
Ochi et al.

(10) Patent No.: US 12,422,451 B2
(45) Date of Patent: Sep. 23, 2025

(54) CAMERA HOLDING DEVICE FOR AUTOMATIC ANALYSIS APPARATUS

(71) Applicant: Hitachi High-Tech Corporation, Tokyo (JP)

(72) Inventors: Manabu Ochi, Tokyo (JP); Jun Etoh, Tokyo (JP); Kenshiro Sakata, Tokyo (JP); Yoichiro Suzuki, Tokyo (JP); Tetsuji Kawahara, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 18/710,105

(22) PCT Filed: Oct. 24, 2022

(86) PCT No.: PCT/JP2022/039474
§ 371 (c)(1),
(2) Date: May 14, 2024

(87) PCT Pub. No.: WO2023/100529
PCT Pub. Date: Jun. 8, 2023

(65) Prior Publication Data
US 2025/0012826 A1    Jan. 9, 2025

(30) Foreign Application Priority Data
Dec. 2, 2021    (JP) ................. 2021-196149

(51) Int. Cl.
*G01N 35/10*    (2006.01)
*G01N 35/02*    (2006.01)
*H04N 23/54*    (2023.01)

(52) U.S. Cl.
CPC ....... *G01N 35/1009* (2013.01); *G01N 35/025* (2013.01); *H04N 23/54* (2023.01); *G01N 2035/1025* (2013.01)

(58) Field of Classification Search
CPC ............. G01N 35/1009; G01N 35/025; G01N 2035/1025; H04N 23/54
(Continued)

(56) References Cited

U.S. PATENT DOCUMENTS

2005/0135904 A1* 6/2005 Wivagg ............... G21C 17/013
414/222.01
2008/0006653 A1* 1/2008 Dai ....................... B01L 3/0268
222/75
(Continued)

FOREIGN PATENT DOCUMENTS

JP    2002-350970 A    12/2002
JP    2006-071451 A    3/2006
(Continued)

OTHER PUBLICATIONS

International Search Report Issued in PCT/JP2022/039474 dated Nov. 29, 2022, with English Translation.

*Primary Examiner* — Matthew David Kim
(74) *Attorney, Agent, or Firm* — Foley & Lardner LLP

(57) ABSTRACT

An object of the present invention is to provide a camera holding device for an automatic analysis apparatus, capable of easily adjusting tip positions of pipetting nozzles having different lengths, even with the use of a single single-focus camera. Therefore, the present invention is a camera holding device for an automatic analysis apparatus, which holds a camera to capture an image of the tip of a pipetting nozzle of the automatic analysis apparatus on a pipetting arm that moves the pipetting nozzle through rotational movement, the camera holding device including: an expansion/contraction part that expands and contracts in a vertical direction with respect to the pipetting arm; an arm-side fixing part that fixes one end of the expansion/contraction part to the
(Continued)

pipetting arm; and a camera-side fixing part that fixes the camera to the other end of the expansion/contraction part.

8 Claims, 13 Drawing Sheets

(58) Field of Classification Search
USPC .......................................................... 348/143
See application file for complete search history.

(56) References Cited

U.S. PATENT DOCUMENTS

| | | | | |
|---|---|---|---|---|
| 2013/0329848 | A1* | 12/2013 | Linnebur | G21C 17/013 376/249 |
| 2015/0009321 | A1* | 1/2015 | Goldstein | B23Q 17/2409 348/135 |
| 2015/0273691 | A1* | 10/2015 | Pollack | G01N 35/00623 901/41 |
| 2016/0151915 | A1* | 6/2016 | Nishi | B25J 9/1697 901/6 |
| 2017/0052205 | A1* | 2/2017 | Silbert | G01N 35/0099 |
| 2018/0178389 | A1* | 6/2018 | Aiso | B25J 9/1692 |
| 2021/0142235 | A1* | 5/2021 | Hoover | G06Q 10/06395 |
| 2021/0174486 | A1* | 6/2021 | Chowhan | G06F 18/25 |
| 2021/0304399 | A1* | 9/2021 | Terahai | G06T 7/0006 |
| 2022/0326111 | A1* | 10/2022 | Campos | G01M 99/007 |
| 2023/0184041 | A1* | 6/2023 | Lyles | G06F 18/24 702/34 |

FOREIGN PATENT DOCUMENTS

| | | |
|---|---|---|
| JP | 2008-175791 A | 7/2008 |
| JP | 2010-175420 A | 8/2010 |
| JP | 2012-032310 A | 2/2012 |
| JP | 2017-151002 A | 8/2017 |
| JP | 2019-000961 A | 1/2019 |

* cited by examiner

CAMERA HOLDING DEVICE FOR AUTOMATIC ANALYSIS APPARATUS

TECHNICAL FIELD

The present invention relates to a camera holding device for an automatic analysis apparatus.

BACKGROUND ART

In an automatic analysis apparatus that performs component analysis by mixing a specimen such as serum or urine with a reagent, it is necessary to insert the tips of nozzles into a plurality of narrow spaces such as a specimen container, a reagent container, and a cleaning hole at the time of pipetting the specimen and the reagent. The nozzle used for pipetting the specimen or the reagent in the automatic analysis apparatus is periodically replaced from the viewpoint of maintaining the pipetting accuracy. Then, every time the nozzle is replaced, the number of driving pulses of a stepping motor that moves a pipetting arm needs to be adjusted so that the tip position of the nozzle coincides with the target stop position of the specimen container, the reagent container, the cleaning hole, or the like.

An example of a technique for facilitating this adjustment work is disclosed in PTL 1. The technique described in PTL 1 is to install a camera at the tip of an arm part (pipetting arm) of a moving mechanism that moves a pipette (nozzle) and capture an image of the tip of the nozzle and a target stop position.

CITATION LIST

Patent Literature

PTL 1: JP 2012-32310 A

SUMMARY OF INVENTION

Technical Problem

In the technique described in PTL 1, when pipetting mechanisms for a specimen and a reagent constituting the automatic analysis apparatus have different nozzle lengths, it has been necessary to use a plurality of single-focus lenses having different focal lengths, use a large and heavy zoom lens, and individually adjust a mounting angle on the pipetting arm.

An object of the present invention is to provide a camera holding device for an automatic analysis apparatus that facilitates adjustment of tip positions of pipetting nozzles having different lengths, even with the use of a single single-focus camera.

Solution to Problem

The present invention is a camera holding device for an automatic analysis apparatus, which holds a camera to capture an image of the tip of a pipetting nozzle of the automatic analysis apparatus on a pipetting arm that moves the pipetting nozzle through rotational movement, the camera holding device including: an expansion/contraction part that expands and contracts in a vertical direction with respect to the pipetting arm; an arm-side fixing part that fixes one end of the expansion/contraction part to the pipetting arm; and a camera-side fixing part that fixes the camera to the other end of the expansion/contraction part.

Advantageous Effects of Invention

According to the present invention, it is possible to provide a camera holding device for an automatic analysis apparatus, capable of easily adjusting tip positions of pipetting nozzles having different lengths, even with the use of a single single-focus camera.

DESCRIPTION OF EMBODIMENTS

Hereinafter, embodiments of the present invention will be described in detail with reference to the drawings.

Figure 1:
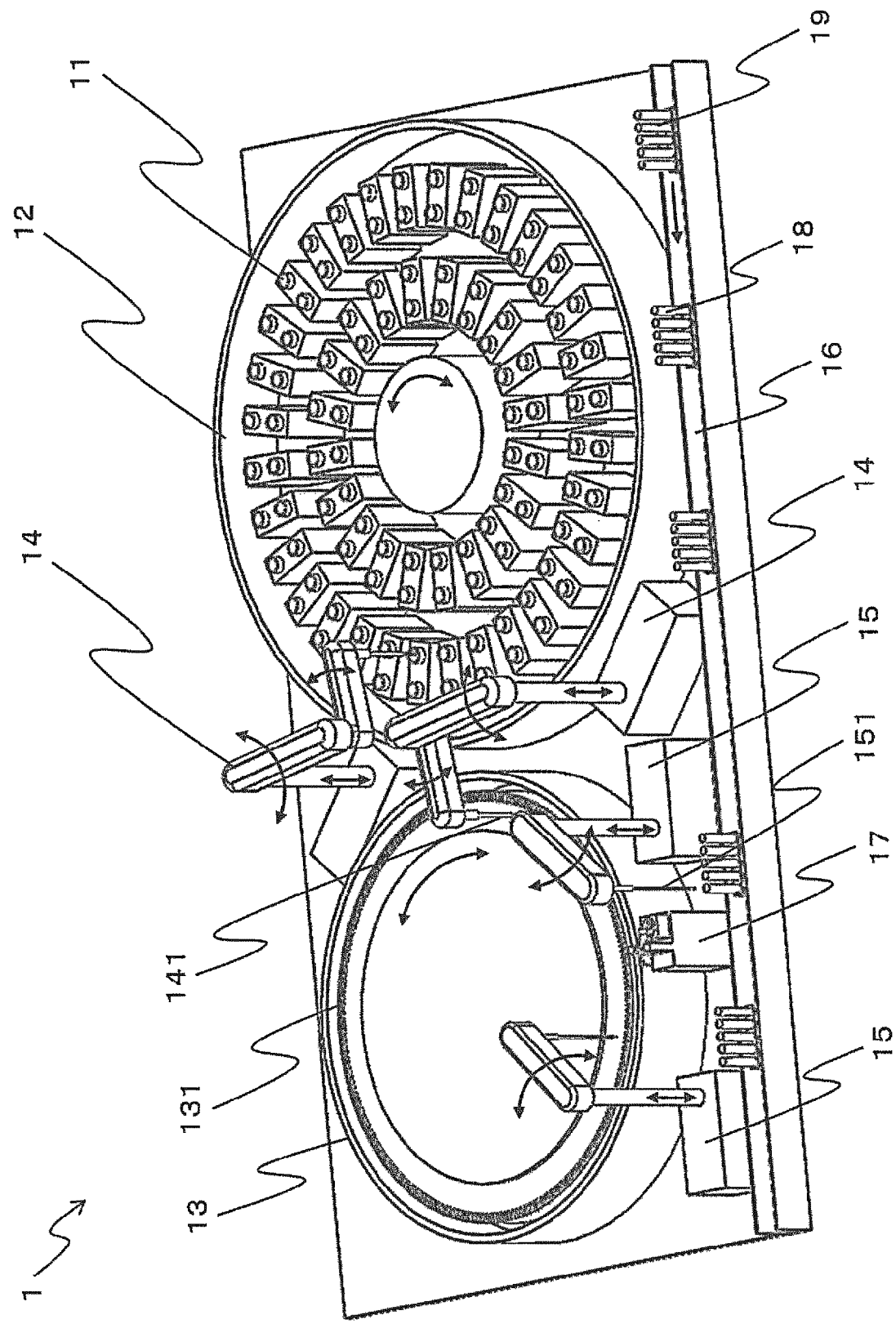
FIG. 1 is a schematic configuration diagram of an automatic analysis apparatus.

FIG. 1 is a schematic configuration diagram of an automatic analysis apparatus 1. The automatic analysis apparatus 1 includes: a reagent disk 12 on which a reagent container 11 is placed, a reaction disk 13 that mixes and reacting a reagent and a specimen; a reagent pipetting mechanism 14 that aspirates or dispenses the reagent; and a specimen pipetting mechanism 15 that aspirates or dispenses the specimen. The reagent pipetting mechanism 14 includes a reagent pipetting nozzle 141 (first pipetting nozzle) for pipetting a reagent, and the specimen pipetting mechanism 15 includes a specimen pipetting nozzle 151 (second pipetting nozzle) for pipetting a specimen.

The specimen charged into the automatic analysis apparatus 1 is placed on a rack 19 and conveyed on a conveyance line 16 while contained in a specimen container 18. A plurality of specimen containers 18 can be placed on the rack 19. Examples of the specimen include blood such as serum and whole blood, and urine. Reaction cells 131 for mixing the reagent and the specimen are provided side by side on the outer periphery of the reaction disk 13, and move by rotating the reaction disk 13.

The reagent pipetting mechanism 14 moves the reagent pipetting nozzle 141 to a stop position for aspirating the reagent from the reagent container 11, a stop position for dispensing the reagent into the reaction cell 131, and a stop position for washing away the reagent attached to the reagent pipetting nozzle 141 in a cleaning tank (not illustrated). Similarly, the specimen pipetting mechanism 15 moves the specimen pipetting nozzle 151 to a stop position for aspirating the specimen from the specimen container 18, a stop position for dispensing the specimen into the reaction cell 131, and a stop position for washing away the specimen attached to the tip of the specimen pipetting nozzle 151 in a cleaning tank 17. In addition, the reagent pipetting mechanism 14 and the specimen pipetting mechanism 15 move up and down the reagent pipetting nozzle 141 and the specimen pipetting nozzle 151 in accordance with the height of each stop position.

Figure 2:
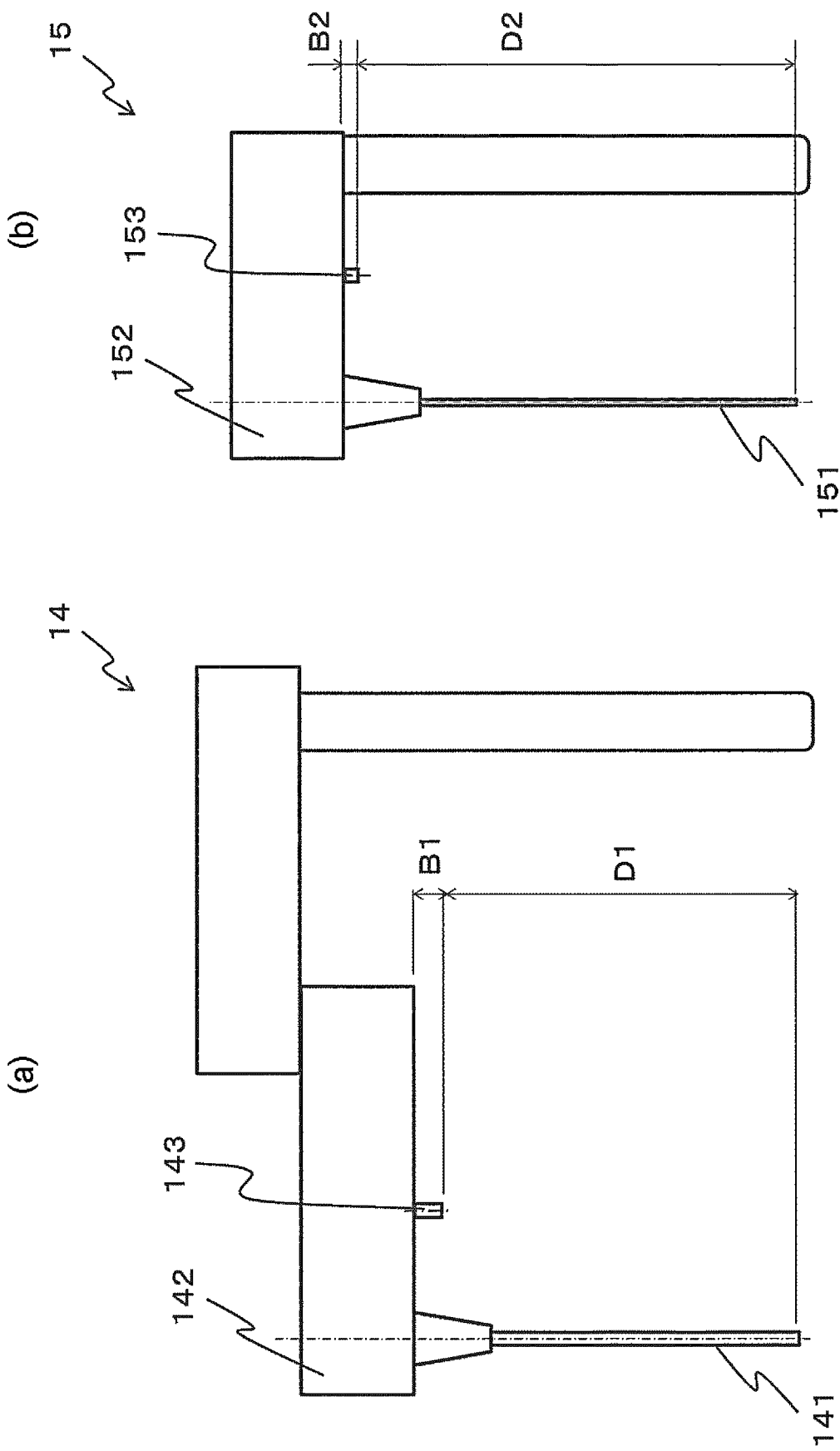
FIG. 2 is a side view of a pipetting mechanism.

FIG. 2 is a side view of the pipetting mechanism, in which (a) illustrates a reagent pipetting arm 142, and (b) illustrates a specimen pipetting arm 152. The reagent pipetting nozzle 141 and the specimen pipetting nozzle 151 have different diameters and lengths depending on the difference in the depth and the pipetting amount of a container for performing aspiration and dispensing. Generally, as illustrated in FIG. 2, the reagent pipetting nozzle 141 is shorter and the specimen pipetting nozzle 151 is longer.

A first mounting member 143 is mounted on the bottom surface of the reagent pipetting arm 142 to protrude from the bottom surface, and a second mounting member 153 is also mounted on the bottom surface of the specimen pipetting arm 152 to protrude from the bottom surface. D1, as shown in FIG. 2(a), is a height from the tip (lower end) of the reagent pipetting nozzle 141 to the tip (lower end) of the first mounting member 143. D2, as shown in FIG. 2(b), is a height from the tip (lower end) of the specimen pipetting nozzle 151 to the tip (lower end) of the second mounting member 153.

First Embodiment

Figure 3:
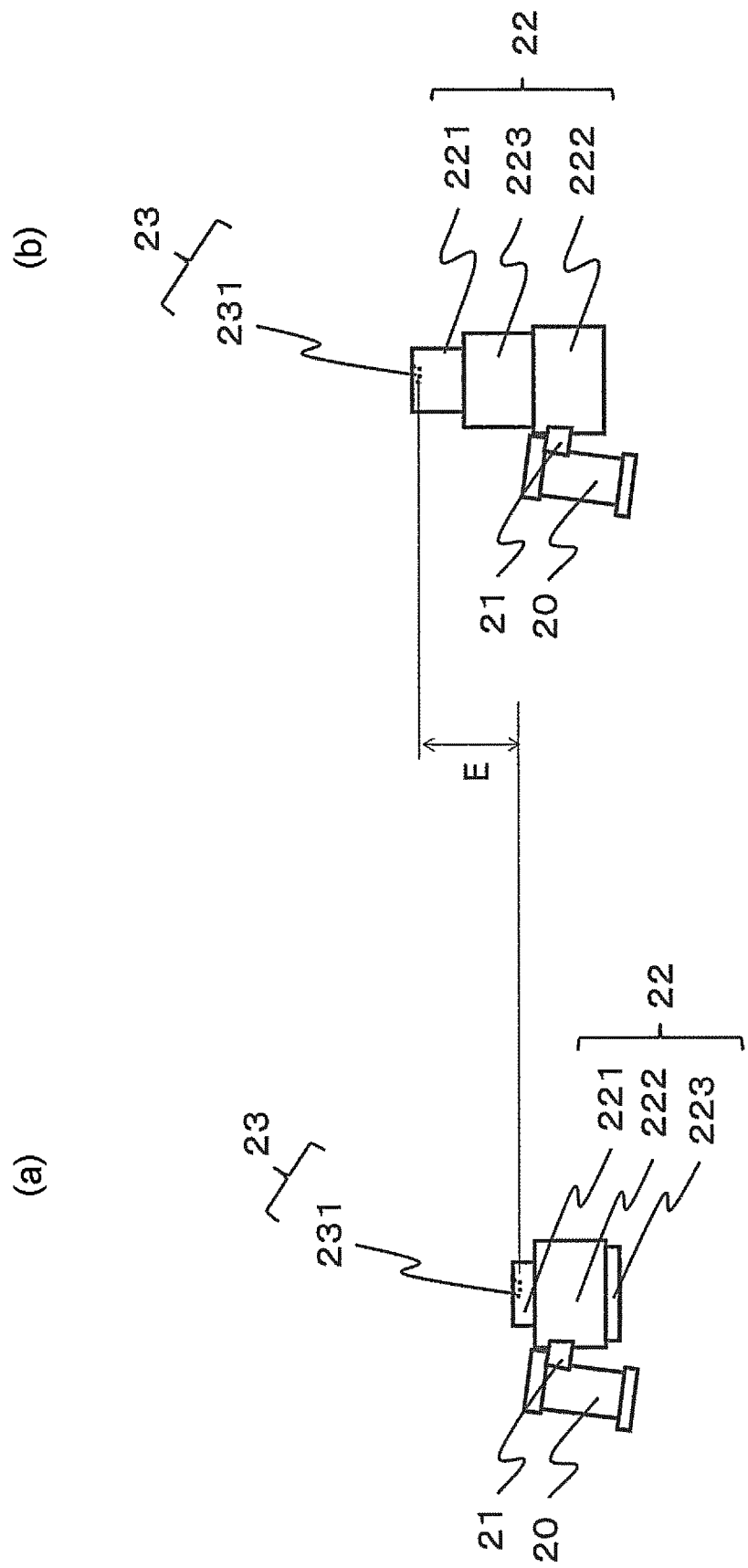
FIG. 3 is a side view of a camera holding device according to a first embodiment.

FIG. 3 is a side view of a camera holding device 2 according to a first embodiment, in which (a) illustrates a state where an expansion/contraction part 22 is most contracted (shortest), and (b) illustrates a state where the expansion/contraction part 22 is most expanded (longest). The camera holding device 2 holds a camera 20 that captures an image of the tip of the reagent pipetting nozzle 141 or the specimen pipetting nozzle 151. As illustrated in FIG. 3, the camera holding device 2 of the present embodiment includes: an expansion/contraction part 22 that expands/contracts in the vertical direction (the lifting/lowering direction of the pipetting nozzle) with respect to each pipetting arm; an arm-side fixing part 23 that fixes one end of the expansion/contraction part 22 to each pipetting arm; and a camera-side fixing part 21 that fixes the camera 20 to the other end of the expansion/contraction part 22.

The expansion/contraction part 22 includes three cylinders having different diameters, that is, an innermost cylinder 221, an outermost cylinder 222, and an intermediate cylinder 223. A plurality of elastically supported projection members (not illustrated) protrude from the inner peripheral surface of the outermost cylinder 222 disposed most outwardly and the outer peripheral surface of the innermost cylinder 221 disposed most inwardly. On the outer peripheral surface and the inner peripheral surface of the intermediate cylinder 223 disposed between the innermost cylinder 221 and the outermost cylinder 222, a plurality of grooves with the deepest ends are formed. Fitting the projection member and the groove connects the cylinders in a state that allows relative movement in the axial and circumferential directions. The innermost cylinder 221 is pushed and pulled while being rotated, so that the protruding member moves along the groove engraved in the intermediate cylinder 223 and falls into the deepest portion of the groove, thereby fixing the cylinders to each other. With this configuration, the length of the expansion/contraction part 22 can be adjusted in two stages. E, as shown in FIG. 3, is the expansion/contraction amount (the difference between the shortest state and the longest state) of the expansion/contraction part 22 of the camera holding device 2.

The arm-side fixing part 23 includes a hole 231 provided in one end (upper end) surface of the innermost cylinder 221, and the hole 231 is fitted over the first mounting member 143 and the second mounting member 153 illustrated in FIG. 2, thereby positioning and fixing the camera holding device 2 to the reagent pipetting arm 142 and the specimen pipetting arm 152. The camera-side fixing part 21 is provided on the side surface of the outermost cylinder 222.

A feature of the present embodiment is that an expansion/contraction amount E of the expansion/contraction part 22 is set equal to a value D2−D1, where D2 and D1 are shown in FIG. 2(b) and FIG. 2(a), respectively, with D2−D1 obtained by subtracting D1 from D2. Here, "equal" means that the expansion/contraction amount E and D2−D1 do not need to be exactly the same value, and it is sufficient if the difference is within the depth of field of the camera 20.

Figure 4:
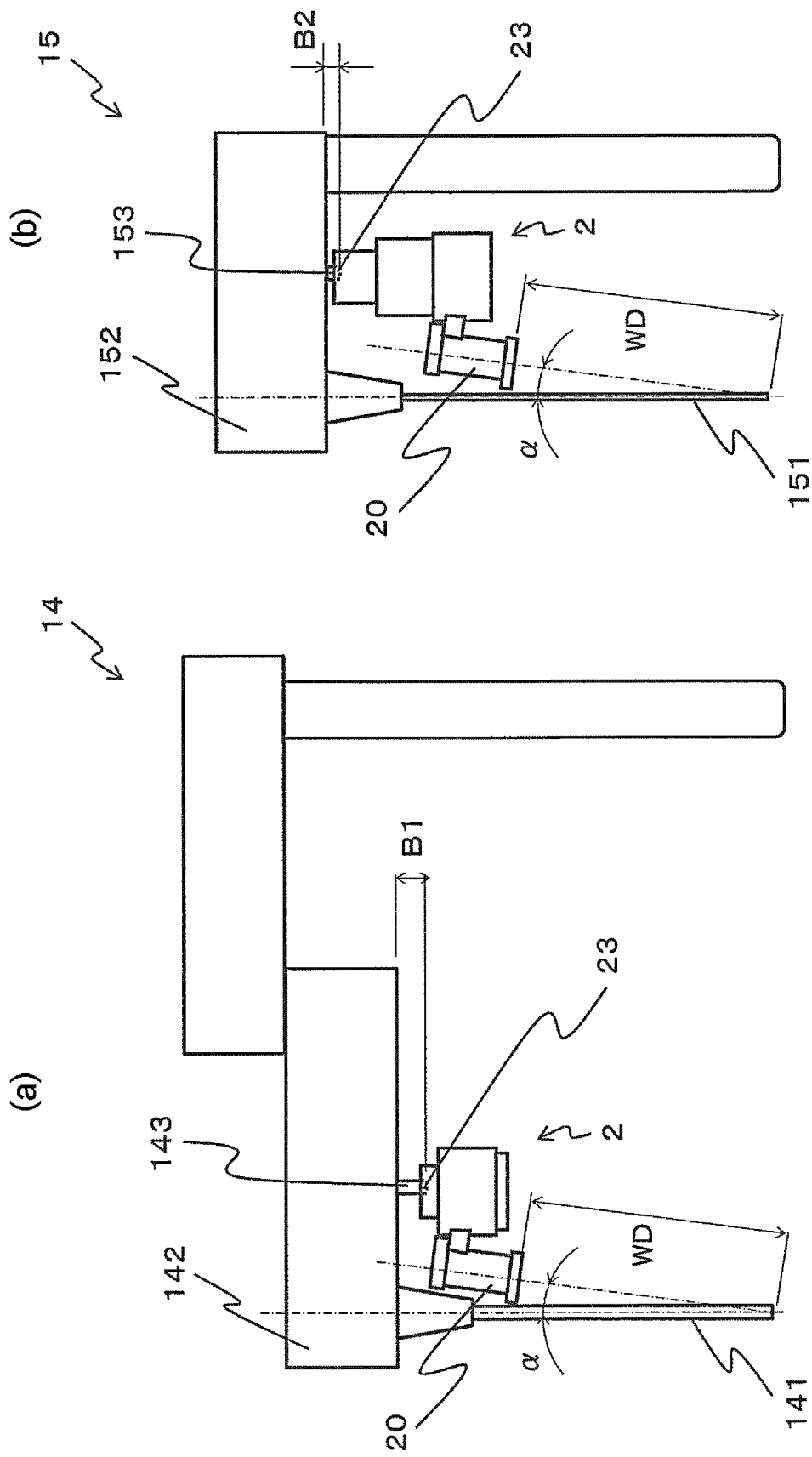
FIG. 4 is a side view illustrating the state of the camera holding device when a camera is mounted on a pipetting arm in the first embodiment.

FIG. 4 is a side view illustrating the state of the camera holding device 2 when the camera 20 is mounted on the pipetting arm in the first embodiment, in which (a) illustrates a state when the camera is mounted on the reagent pipetting arm 142, and (b) illustrates a state when the camera is mounted on the specimen pipetting arm 152. As illustrated in FIG. 4, the camera 20 that captures an image of the tip of the reagent pipetting nozzle 141 is held by the reagent pipetting arm 142 with the expansion/contraction part 22 is the shortest state, and the camera 20 that captures an image of the tip of the specimen pipetting nozzle 151 is held by the specimen pipetting arm 152 with where the expansion/contraction part 22 is the longest. At this time, a distance WD and an angle α between the tip of the reagent pipetting nozzle 141 and the camera 20 in FIG. 4(a) have the same values as a distance WD and an angle α between the tip of the specimen pipetting nozzle 151 and the camera 20 in FIG. 4(b). Therefore, since there are no changes in the focus, composition, and angle of the camera 20 with respect to the tip of each nozzle and the pixel resolution with respect to the nozzle, the tip positions of the nozzles of all the pipetting mechanisms can be adjusted with a single single-focus camera even in an automatic analysis apparatus configured with pipetting nozzles having different lengths.

In the present embodiment, the mounting member has been described as a component different from the camera holding device 2, but may be regarded as a component of the camera holding device 2.

Second Embodiment

Figure 5:
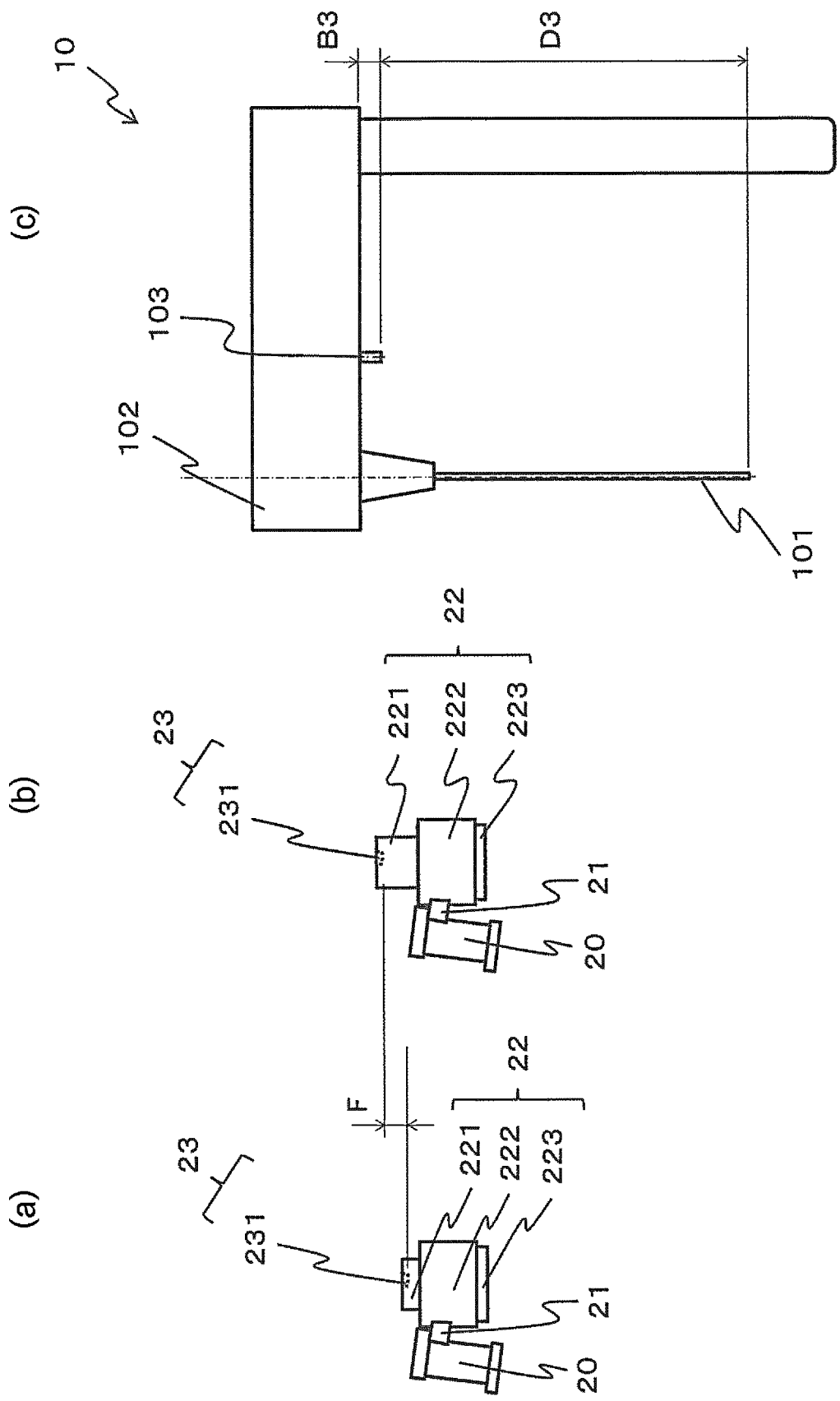
FIG. 5 is a side view of a third pipetting mechanism and a camera holding device illustrating a second embodiment.

FIG. 5 is a side view of a third pipetting mechanism and a camera holding device 2 illustrating a second embodiment. In FIG. 5, parts having the same functions as those of the first embodiment are denoted by the same reference numerals, and the description thereof will be omitted. In the second embodiment, unlike the first embodiment, the automatic analysis apparatus further includes a third pipetting nozzle 101 in addition to the reagent pipetting nozzle 141 (first pipetting nozzle) and the specimen pipetting nozzle 151 (second pipetting nozzle). The third pipetting nozzle 101 is longer than the reagent pipetting nozzle 141 and shorter than the specimen pipetting nozzle 151, and moves through the rotational movement of a third pipetting arm 102. Note that the third pipetting nozzle 101 may be, for example, a nozzle that pipets a reagent, which differs from the reagent pipetted by the reagent pipetting nozzle 141, from the reagent disk 12 of the same automatic analysis apparatus, or may be a nozzle that pipets a reagent or a specimen for another inspection item from a unit adjacent to the automatic analysis apparatus.

A first feature of the present embodiment is that a third mounting member 103 protruding downward from the bottom surface of the third pipetting arm 102 is provided as illustrated in FIG. 5(*c*). The hole 231 of the arm-side fixing part 23 is fitted over the third mounting member 103, thereby positioning and fixing the camera holding device 2 to the third pipetting arm 102.

A second feature of the present embodiment is that the pressure between the intermediate cylinder 223 and the innermost cylinder 221 is set lower than the pressure between the intermediate cylinder 223 and the outermost cylinder 222. In this case, when the innermost cylinder 221 is pulled while being rotated in the state of FIG. 5(*a*), the cylinders are fixed to each other even in a state where only the innermost cylinder 221 is expanded (with an expansion amount F) as illustrated in FIG. 5(*b*). That is, the expansion/contraction part 22 of the present embodiment can be fixed at an intermediate length, in addition to the lengths of the two stages described above, thereby enabling the length to be adjusted to a total of three levels.

Therefore, in the present embodiment, when the expansion/contraction part 22 is in the state of the expansion amount F, the camera 20 that captures an image of the tip of the third pipetting nozzle 101 is held by fitting the hole 231 on the upper surface of the innermost cylinder 221 over the third mounting member 103. The expansion amount F is the maximum value of the relative expansion amount of the innermost cylinder 221 with respect to the intermediate cylinder 223, and is set equal to a difference D3−D1 between a distance D3 from the tip (lower end) of the third pipetting nozzle 101 to the tip (lower end) of the third mounting member 103 and a distance D1 illustrated in FIG. 2(*a*). As a result, the camera 20 can be mounted on the pipetting arm without changing the distance and angle between the nozzle tip and the camera 20 even for three types of pipetting arms having different lengths of the pipetting nozzles.

Note that the number of cylinders constituting the expansion/contraction part 22 is not limited to three. By setting the pressurization in multiple stages as well, the length of the expansion/contraction part 22 can be adjusted in multiple stages, and even in an automatic analysis apparatus including various pipetting mechanisms, the tip positions of the nozzles of all the pipetting mechanisms can be adjusted with a single single-focus camera.

Third Embodiment

Figure 6:
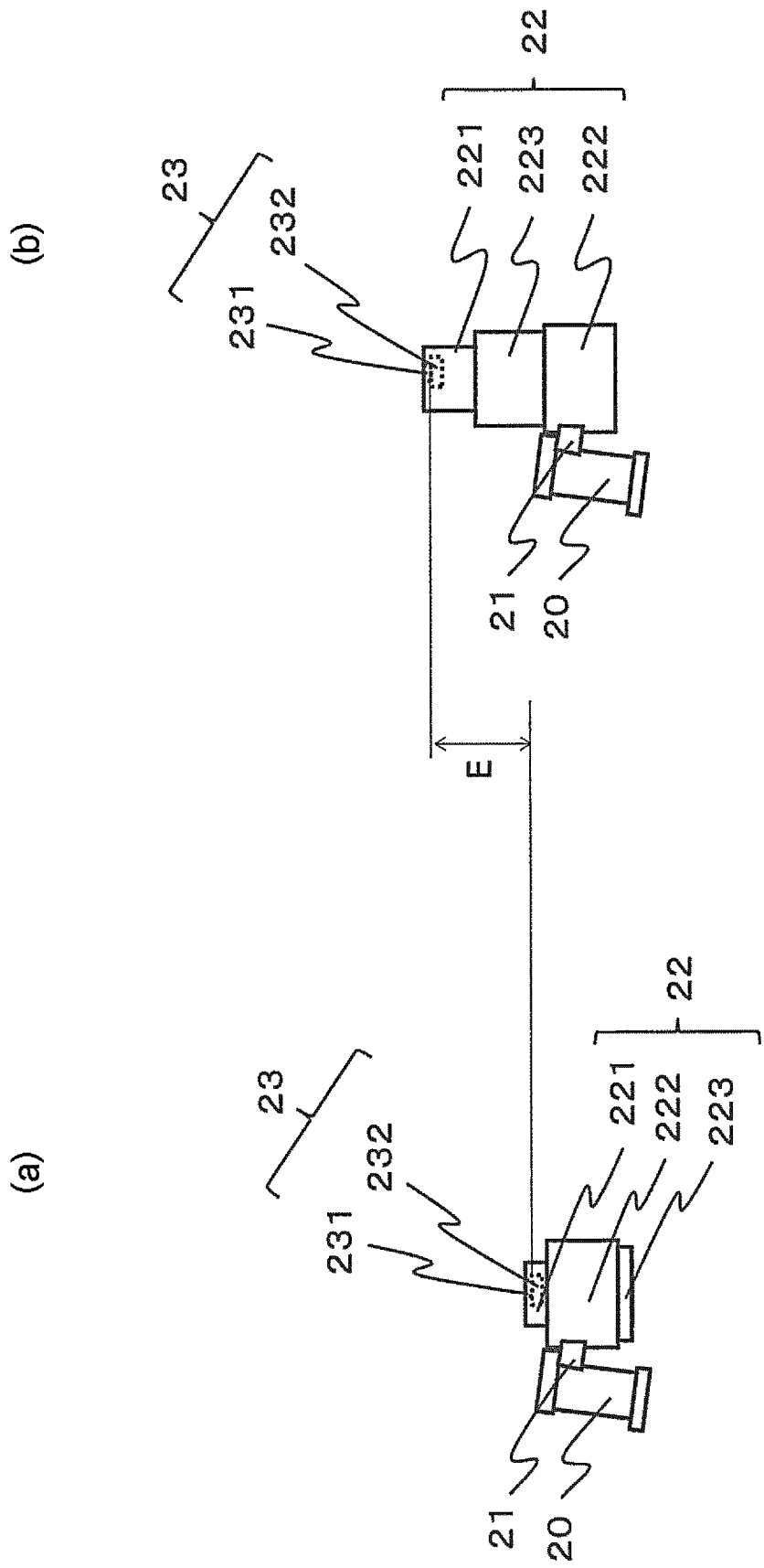
FIG. 6 is a side view of a camera holding device according to a third embodiment.

FIG. 6 is a side view of a camera holding device 2 according to a third embodiment, in which (a) illustrates a state where the expansion/contraction part 22 is shortest, and (b) illustrates a state where the expansion/contraction part 22 is longest. A first feature of the present embodiment is that both the first mounting member 143 and the second mounting member 153 are formed of a magnetic material. A second feature of the present embodiment is that, as illustrated in FIG. 6, a magnet 232 for attracting the first mounting member 143 and the second mounting member 153 is provided on the bottom surface of the hole 231 constituting the arm-side fixing part 23.

Figure 7:
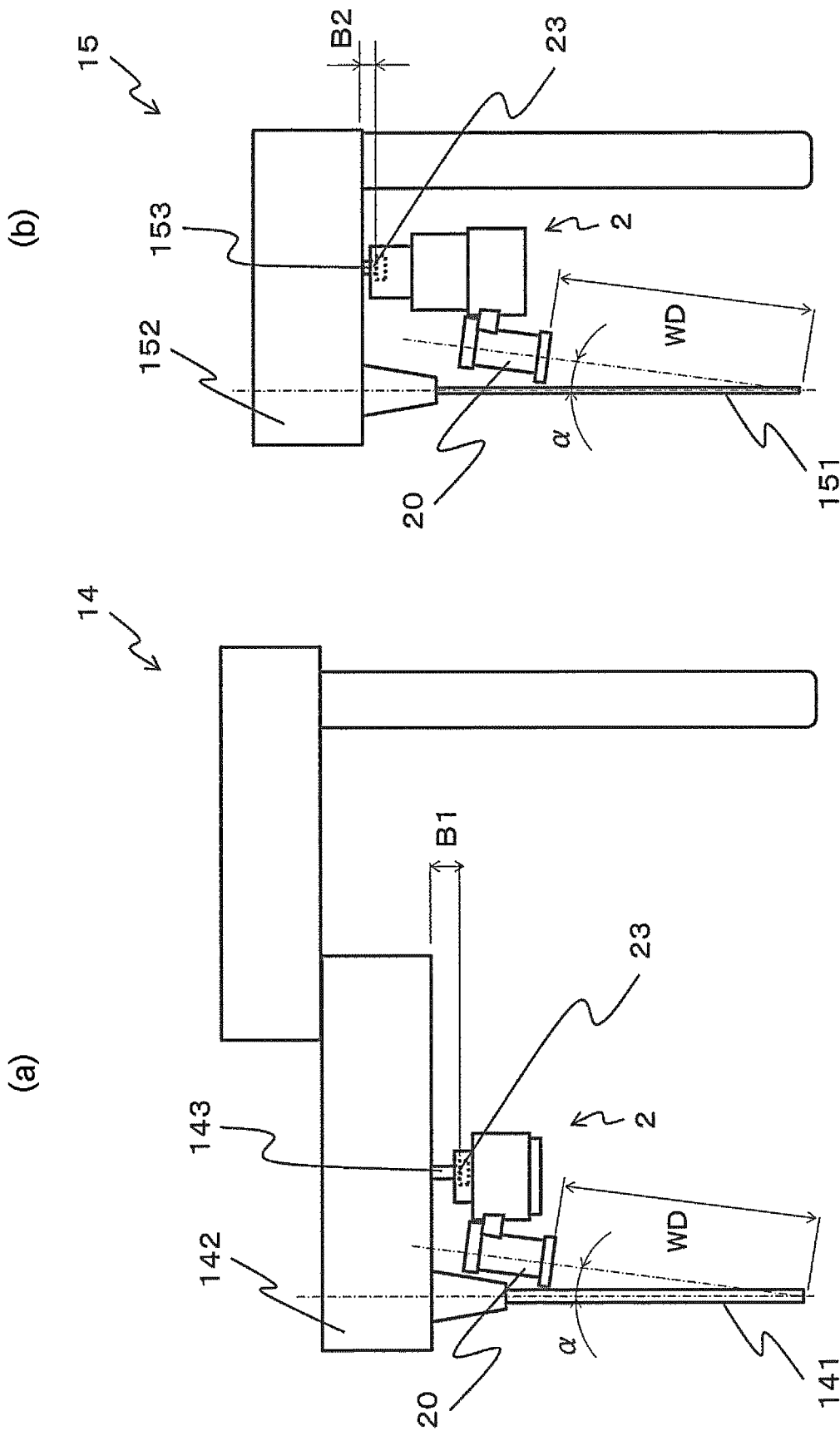
FIG. 7 is a side view illustrating the state of the camera holding device when a camera is mounted on a pipetting arm in the third embodiment.

FIG. 7 is a side view illustrating the state of the camera holding device 2 when the camera 20 is mounted on the pipetting arm in the third embodiment, in which (a) illustrates a state when the camera is mounted on the reagent pipetting arm 142, and (b) illustrates a state when the camera is mounted on the specimen pipetting arm 152. As illustrated in FIG. 7, in the present embodiment as well, the camera 20 that captures an image of the tip of the reagent pipetting nozzle 141 is held by the reagent pipetting arm 142 with the expansion/contraction part 22 in the shortest state, and the camera 20 that captures an image of the tip of the specimen pipetting nozzle 151 is held by the specimen pipetting arm 152 with the expansion/contraction part 22 in the longest state. In addition, a distance WD and an angle α between the tip of the reagent pipetting nozzle 141 and the camera 20 in FIG. 7(*a*) also have the same values as a distance WD and an angle α between the tip of the specimen pipetting nozzle 151 and the camera 20 in FIG. 7(*b*).

In the present embodiment, the force of the magnet 232 of the arm-side fixing part 23 attracting the first mounting member 143 and the second mounting member 153 is used to facilitate the mounting and detachment work of the camera 20 to and from the pipetting arm.

Fourth Embodiment

Figure 8:
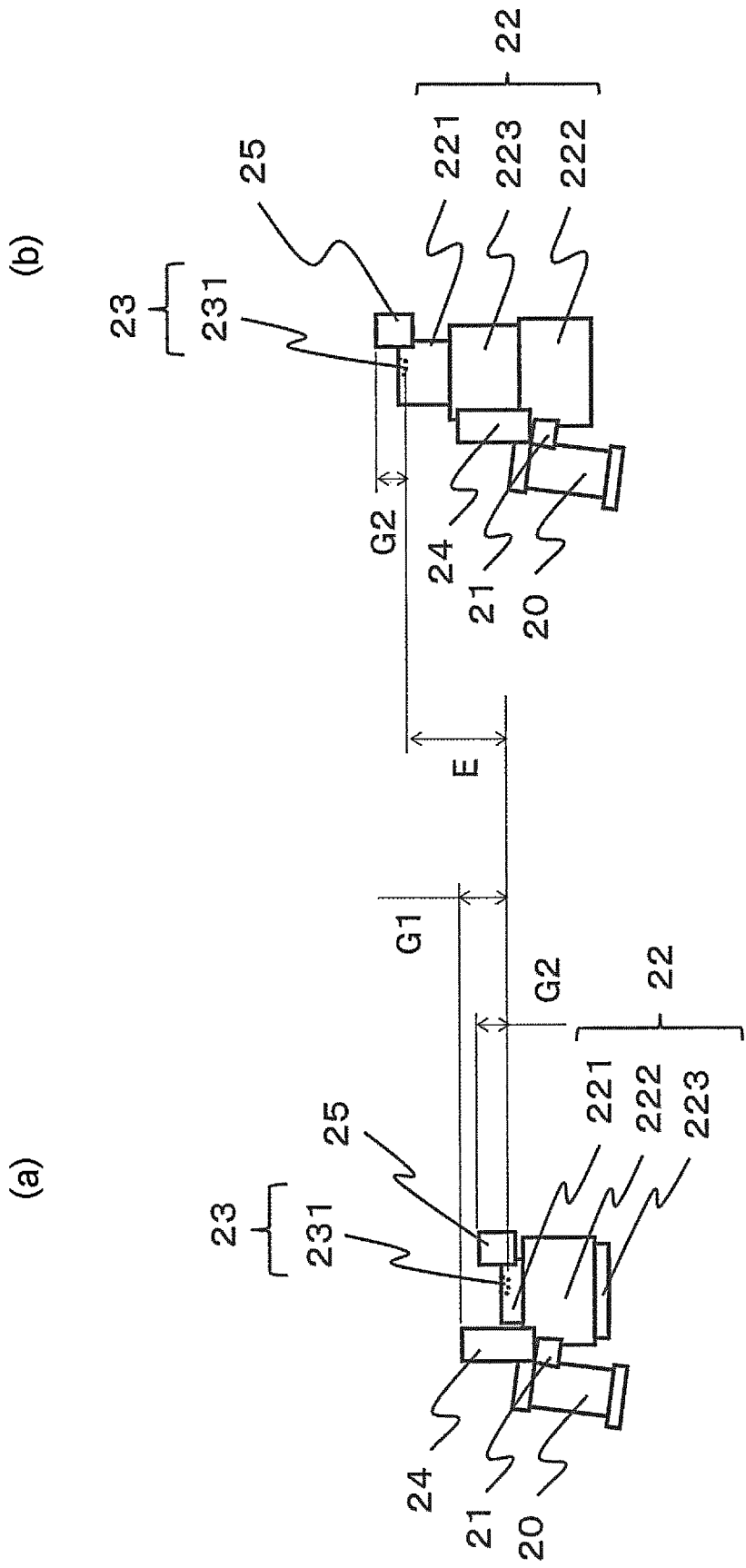
FIG. 8 is a side view of a camera holding device according to a fourth embodiment.

FIG. 8 is a side view of a camera holding device 2 according to a fourth embodiment, in which (a) illustrates a state where the expansion/contraction part 22 is shortest, and (b) illustrates a state where the expansion/contraction part 22 is longest.

A first feature of the present embodiment is that the outermost cylinder 222 is provided with a pair of first extensions 24 extending in the expansion/contraction direction of the expansion/contraction part 22, and the innermost cylinder 221 is provided with a pair of second extensions 25 extending in the expansion/contraction direction of the expansion/contraction part 22.

A second feature of the present embodiment is that a height G1 (see FIG. 8(*a*)) from the bottom surface of the hole 231 of the arm-side fixing part 23 to the upper end of the first extension 24 is longer than a protrusion amount B1 (see FIG. 2(*a*)) from the bottom surface of the reagent pipetting arm 142 of the first mounting member 143 and shorter than the expansion/contraction amount E (see FIG. 3) of the expansion/contraction part 22.

A third feature of the present embodiment is that a height G2 (see FIG. 8(*b*)) from the bottom surface of the hole 231 of the arm-side fixing part 23 to the upper end of the second extension 25 is shorter than protrusion amount B1 described above and longer than the protrusion amount B2 (see FIG. 2(*b*)) of the second mounting member 153 from the bottom surface of the specimen pipetting arm 152.

A fourth feature of the present embodiment is that the spacing of the pair of first extensions 24 is equal to the width of the reagent pipetting arm 142, and the spacing of the pair of second extensions 25 is equal to the width of the specimen pipetting arm 152.

Figure 9:
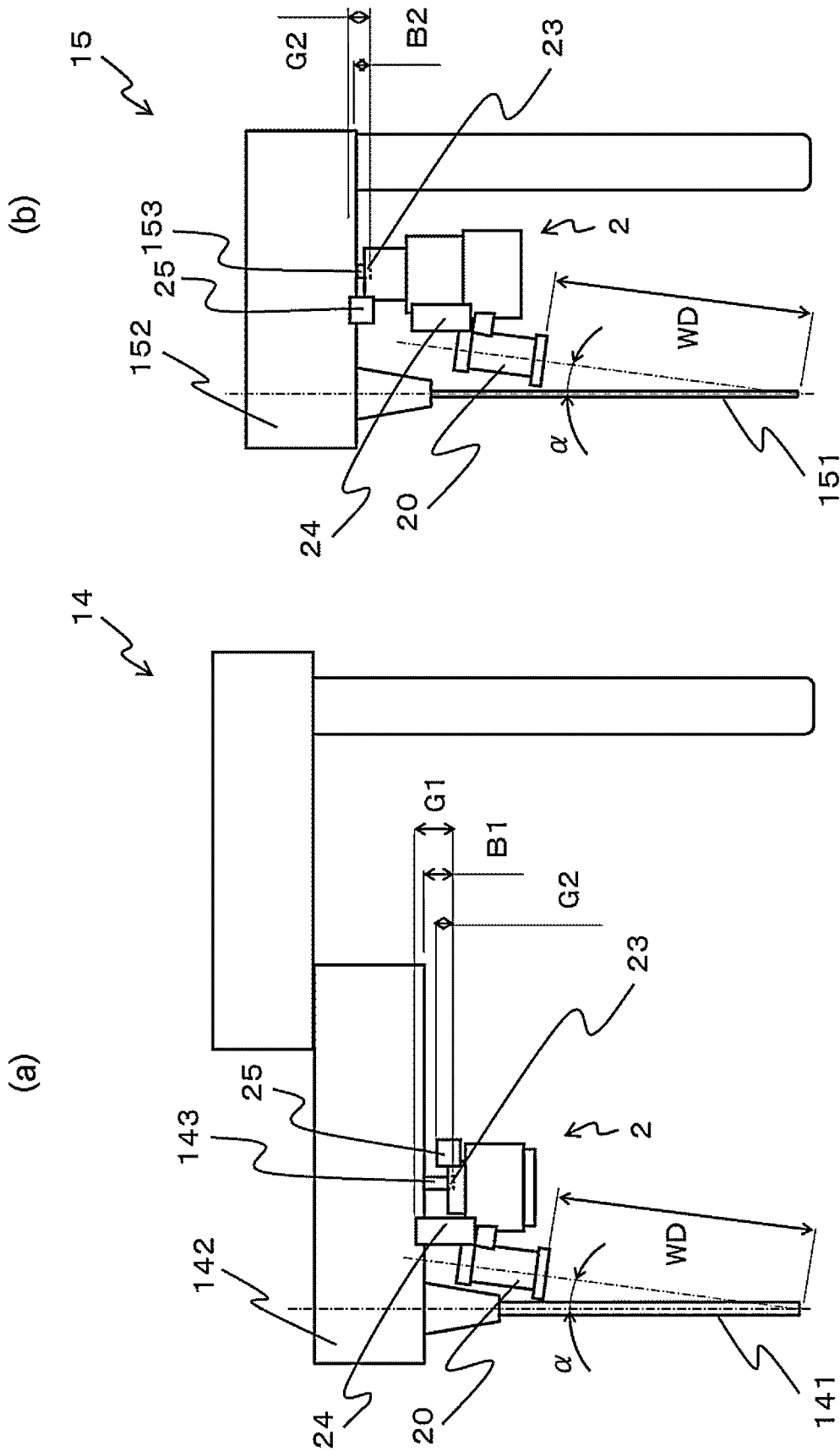
FIG. 9 is a side view illustrating the state of the camera holding device when a camera is mounted on a pipetting arm in the fourth embodiment.

FIG. 9 is a side view illustrating the state of the camera holding device 2 when the camera 20 is mounted on the pipetting arm in the fourth embodiment, in which (a) illustrates a state when the camera is mounted on the reagent pipetting arm 142, and (b) illustrates a state when the camera is mounted on the specimen pipetting arm 152.

As illustrated in FIG. 9(a), when the camera 20 is mounted on the reagent pipetting arm 142 with the expansion/contraction part 22 in the shortest state, the first extension 24 protrudes most upward and faces the side surface of the reagent pipetting arm 142. Here, in the present embodiment, as described above, since the spacing of the pair of first extensions 24 is equal to the width of the reagent pipetting arm 142, the first extensions 24 grip the side surfaces of the reagent pipetting arm 142, which ensures that the camera 20 can be held in position. At this time, a space B1 larger than the G2 described above is ensured between the bottom surface of the hole 231 of the arm-side fixing part 23 and the bottom surface of the reagent pipetting arm 142. Therefore, even when the reagent pipetting arm 142 is wider than the specimen pipetting arm 152, the second extension 25 does not interfere with the reagent pipetting arm 142.

On the other hand, as illustrated in FIG. 9(b), when the camera 20 is mounted on the specimen pipetting arm 152 in a state where the expansion/contraction part 22 is longest, the second extension 25 protrudes most upward and faces the side surface of the specimen pipetting arm 152. Here, in the present embodiment, as described above, since the spacing of the pair of second extensions 25 is equal to the width of the specimen pipetting arm 152, the second extensions 25 grip the side surfaces of the specimen pipetting arm 152, which can ensure that the camera 20 can be held in position. At this time, even when the width of the specimen pipetting arm 152 is wider than the width of the reagent pipetting arm 142, the first extension 24 does not interfere with the specimen pipetting arm 152.

According to the present embodiment, when the camera 20 is mounted on either the reagent pipetting arm 142 or the specimen pipetting arm 152, the first extensions 24 or the second extensions 25 grip the side surfaces of the pipetting arm. This not only improves the positioning accuracy of the camera 20 in the Yaw direction, but can also suppress the displacement and tilting of the camera after mounting caused by the movement of the pipetting arm. In addition, by making the spacing of the pair of first extensions 24 correspond to the shape (width dimension) of the reagent pipetting arm 142 and making the spacing of the pair of second extensions 25 correspond to the shape (width dimension) of the specimen pipetting arm 152, the camera can be held with high accuracy even for pipetting arms of different shapes.

Fifth Embodiment

The pipetting arm may be provided with a screw hole for fixing an electronic substrate for liquid level detection, a screw hole used for connecting a cord for grounding, and the like in advance. In this manner, when the pipetting arm is provided with an existing screw hole, the mounting member can be fastened using the existing screw hole.

Figure 10:
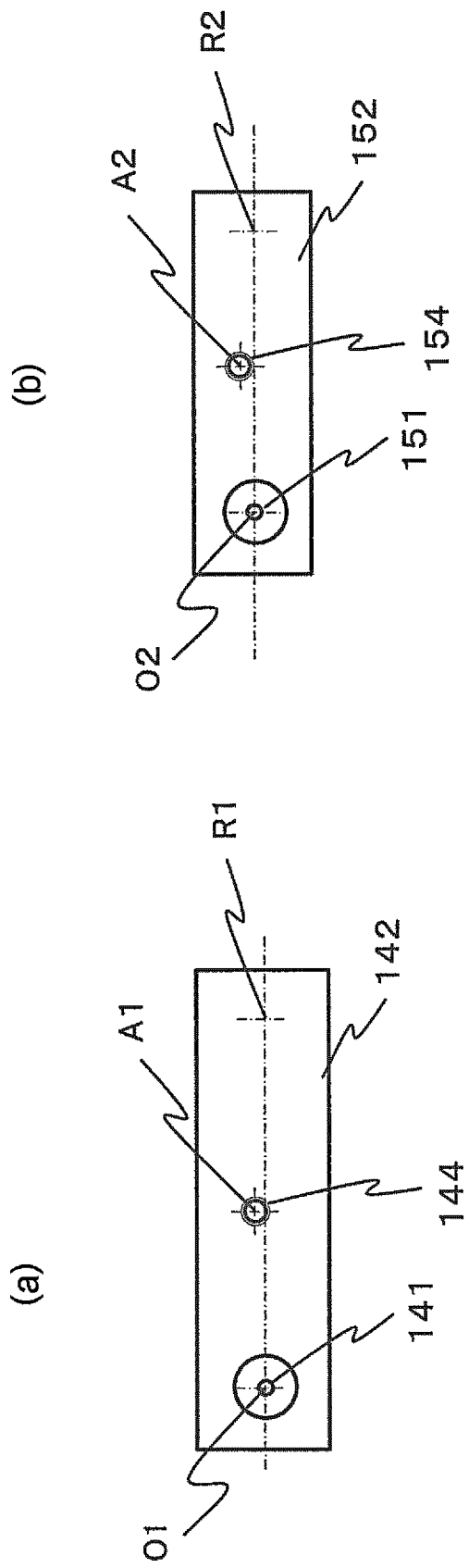
FIG. 10 is a plan view illustrating a bottom surface of a pipetting arm in a fifth embodiment.

In a fifth embodiment, the mounting member described above is fixed using an existing screw hole provided in the bottom surface of the pipetting arm. FIG. 10 is a plan view illustrating the bottom surface of the pipetting arm in the fifth embodiment, in which (a) illustrates the position of a screw hole 144 provided in the bottom surface of the reagent pipetting arm 142, and (b) illustrates the position of a screw hole 154 provided in the bottom surface of the specimen pipetting arm 152.

In FIG. 10(a), O1 is the intersection point between the central axis of the reagent pipetting nozzle 141 and the bottom surface of the reagent pipetting arm 142, A1 is the intersection point between the central axis of the existing screw hole 144 and the bottom surface of the reagent pipetting arm 142, and R1 is the intersection point between the rotational axis of the reagent pipetting arm 142 and the bottom surface of the reagent pipetting arm 142. Note that the screw hole 144 forms a "female screw", and is fastened with a "male screw" provided at the upper end of the first mounting member 143.

Similarly, in FIG. 10(b), O2 is the intersection point between the central axis of the specimen pipetting nozzle 151 and the bottom surface of the specimen pipetting arm 152, A2 is the intersection point between the central axis of the existing screw hole 154 and the bottom surface of the specimen pipetting arm 152, and R2 is the intersection point between the rotational axis of the specimen pipetting arm 152 and the bottom surface of the specimen pipetting arm 152. Note that the screw hole 154 forms a "female screw", and is fastened with a "male screw" provided at the upper end of the second mounting member 153.

As can be seen from a comparison between (a) and (b) in FIG. 10, the positional relationship of A1 with respect to O1 may differ from the positional relationship of A2 with respect to O2. In this case, the positional relationship of the screw hole 144 (first mounting member 143) in the reagent pipetting arm 142 with respect to the reagent pipetting nozzle 141 differs from the positional relationship of the screw hole 154 (second mounting member 153) in the specimen pipetting arm 152 with respect to the specimen pipetting nozzle 151. Thus, if the central axis of the expansion/contraction part 22 of the camera holding device 2 described above coincides with the central axes of these screw holes (mounting members), the distance and angle from the tip of the pipetting nozzle to the camera 20 differ between the reagent pipetting nozzle and the specimen pipetting nozzle.

Figure 11:
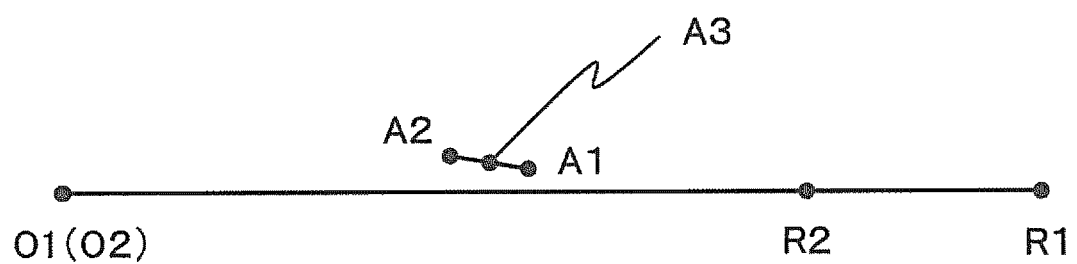
FIG. 11 is a view illustrating a relative position of a central axis (A3) of an expansion/contraction part with respect to a screw hole (A1) of a reagent pipetting arm and a screw hole (A2) of a specimen pipetting arm.

Therefore, in the camera holding device 2 according to the present embodiment, the hole 231 of the arm-side fixing part 23 is provided at a position eccentric from the central axis (A3) of the expansion/contraction part 22. FIG. 11 is a view illustrating the relative position of the central axis (A3) of the expansion/contraction part 22 with respect to the screw hole 144 (A1) of the reagent pipetting arm 142 and the screw hole 154 (A2) of the specimen pipetting arm 152. Specifically, the positions of A1 and A2 are illustrated in a state where O1 and O2 in FIG. 10 coincide with each other and a line segment O1-R1 and a line segment O2-R2 overlap on the same straight line. As illustrated in FIG. 11, in the present embodiment, the central axis (A3) of the expansion/contraction part 22 is positioned vertically downward passing through the midpoint of a line segment A1-A2.

Figure 12:
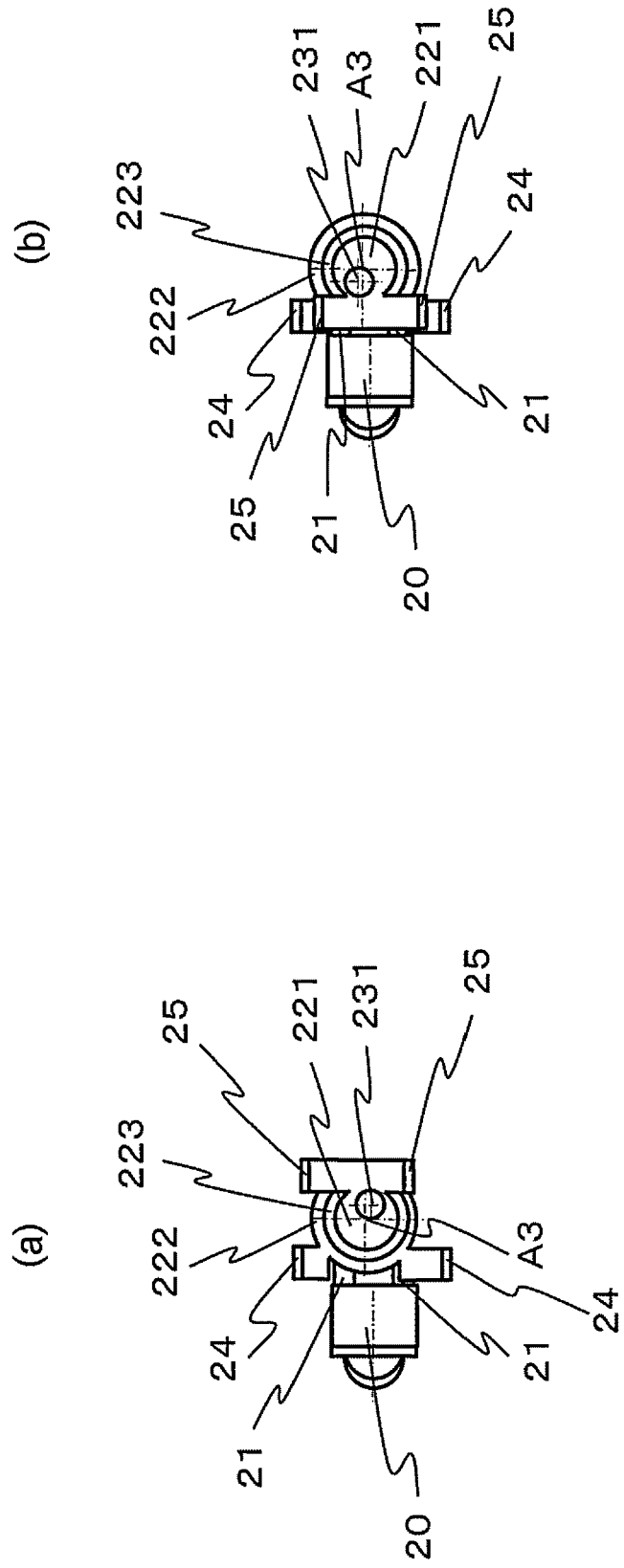
FIG. 12 is a plan view of a camera holding device according to the fifth embodiment as viewed from above.

FIG. 12 is a plan view of the camera holding device 2 according to the fifth embodiment as viewed from above, in which (a) illustrates a state where the expansion/contraction part 22 is shortest, and (b) illustrates a state where the expansion/contraction part 22 is longest. The innermost cylinder 221 is relatively displaced in the axial direction while relatively rotating with respect to the outermost cylinder 222, so that the hole 231 at the position eccentric from the central axis (A3) of the expansion/contraction part 22 is displaced in the circumferential direction by the expansion/contraction amount of the expansion/contraction part 22. In the state where the expansion/contraction part 22 is shortest, as illustrated in FIG. 12(a), the positional relationship of the hole 231 with respect to the central axis (A3) of the expansion/contraction part is the positional relationship A1 with respect to A3 in FIG. 11. In the state where the expansion/contraction part 22 is longest, as illustrated in FIG. 12(b), the positional relationship of the hole 231 with respect to the central axis (A3) of the expansion/contraction part is the positional relationship of A2 with respect to A3 of FIG. 11.

Therefore, even when the position of the existing screw hole of the reagent pipetting arm 142 relatively differs from the position of the existing screw hole of the specimen pipetting arm 152, the camera holding device 2 can be mounted on each pipetting arm such that the positional relationship of the central axis of the expansion/contraction part 22 with respect to each pipetting nozzle stays unchanged. In the present embodiment, the groove is formed in the intermediate cylinder 223 such that the innermost cylinder 221 rotates 180 degrees with respect to the outermost cylinder 222 as the expansion/contraction part 22 extends from the shortest state to the longest state. However, the angle of rotation from the shortest to the longest is not limited to 180 degrees.

Figure 13:
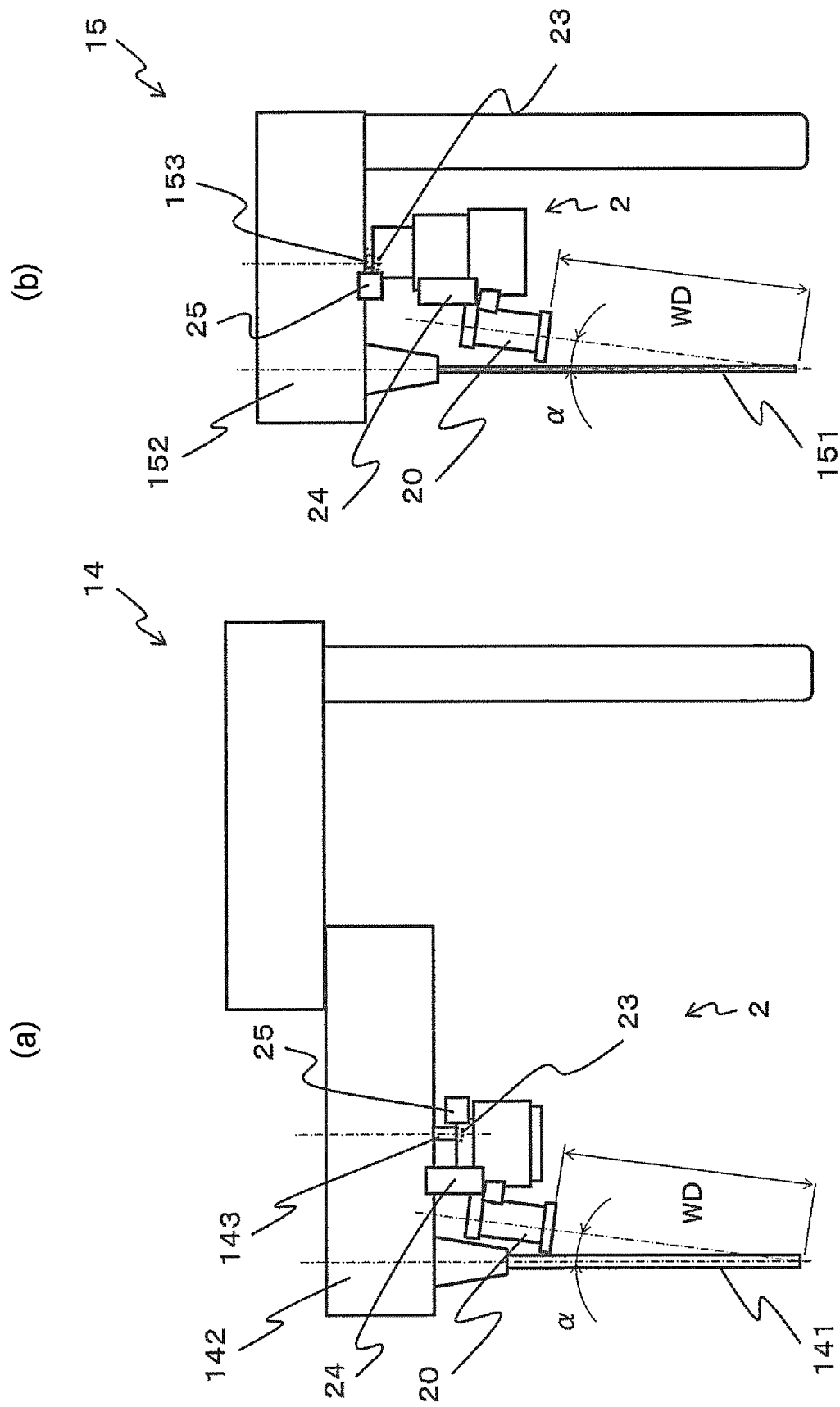
FIG. 13 is a side view illustrating the state of the camera holding device when a camera is mounted on a pipetting arm in the fifth embodiment.

FIG. 13 is a side view illustrating the state of the camera holding device 2 when the camera 20 is mounted on the pipetting arm in the fifth embodiment, in which (a) illustrates a state when the camera is mounted on the reagent pipetting arm 142, and (b) illustrates a state when the camera is mounted on the specimen pipetting arm 152. As illustrated in FIG. 13, since there is no change in the position of the camera 20 fixed to the outermost cylinder 222 with respect to the tip of each pipetting nozzle, the focus, composition, angle, and pixel resolution with respect to the nozzle of the camera 20 stay unchanged.

In the present embodiment, since the existing screw hole is used, it is possible to mount the camera on the existing automatic analysis apparatus without performing new processing. Further, the hole 231 and the magnet 232 constituting the arm-side fixing part 23 need only be common to both pipetting arms, thereby enabling reduction in the weight of the camera holding device and the manufacturing cost.

The above embodiments have been described in detail for the purpose of describing the present invention in an easy-to-understand manner and are not necessarily limited to those having all the configurations described above. It is also possible to replace a part of the configuration of one embodiment with the configuration of another embodiment or to add the configuration of another embodiment to the configuration of one embodiment. It is also possible to add, delete, or replace a part of the configuration of each embodiment with another configuration.

REFERENCE SIGNS LIST 1 automatic analysis apparatus
2 camera holding device
10 third pipetting mechanism
11 reagent container
12 reagent disk
13 reaction disk
14 reagent pipetting mechanism
15 specimen pipetting mechanism
16 conveyance line
17 cleaning tank
18 specimen container
19 rack
20 camera
21 camera-side fixing part
22 expansion/contraction part
23 arm-side fixing part
24 first extension
25 second extension
101 third pipetting nozzle
102 third pipetting arm
103 third mounting member
131 reaction cell
141 reagent pipetting nozzle
142 reagent pipetting arm
143 first mounting member
144 screw hole
151 specimen pipetting nozzle
152 specimen pipetting arm
153 second mounting member
154 screw hole
221 innermost cylinder
222 outermost cylinder
223 intermediate cylinder
231 hole
232 magnet

The invention claimed is:

1. A camera holding device for an automatic analysis apparatus, the camera holding device holding a camera to capture an image of a tip of a pipetting nozzle of the automatic analysis apparatus on a pipetting arm that moves the pipetting nozzle through rotational movement, the camera holding device comprising:
    an expansion/contraction part that expands and contracts in a vertical direction with respect to the pipetting arm;
    an arm-side fixing part that fixes one end of the expansion/contraction part to the pipetting arm; and
    a camera-side fixing part that fixes the camera to another end of the expansion/contraction part.

2. The camera holding device for an automatic analysis apparatus according to claim 1, wherein
    the automatic analysis apparatus includes
        a first pipetting arm that rotates a first pipetting nozzle,
        a second pipetting arm that moves a second pipetting nozzle longer than the first pipetting nozzle through rotational movement,
        a first mounting member that protrudes downward from a bottom surface of the first pipetting arm, and
        a second mounting member that protrudes downward from a bottom surface of the second pipetting arm,
    the arm-side fixing part includes a hole to be fitted over the first mounting member and the second mounting member,
    a difference between a height from a tip of the second pipetting nozzle to a tip of the second mounting member and a height from a tip of the first pipetting nozzle to a tip of the first mounting member is an expansion/contraction amount of the expansion/contraction part,
    a camera that captures an image of the first pipetting nozzle is held by the first pipetting arm in a state where the expansion/contraction part is most contracted, and
    a camera that captures an image of the second pipetting nozzle is held by the second pipetting arm in a state where the expansion/contraction part is most expanded.

3. The camera holding device for an automatic analysis apparatus according to claim 2, wherein the expansion/contraction part includes a plurality of cylinders having different diameters, the arm-side fixing part is provided on an upper surface of an innermost cylinder, and the camera-side fixing part is provided on a side surface of an outermost cylinder.

4. The camera holding device for an automatic analysis apparatus according to claim 3, wherein a magnet that attracts the first mounting member and the second mounting member formed using a magnetic material is provided on a bottom surface of the hole of the arm-side fixing part.

5. The camera holding device for an automatic analysis apparatus according to claim 3, wherein
a positional relationship of the first mounting member with respect to the first pipetting nozzle in the first pipetting arm differs from a positional relationship of the second mounting member with respect to the second pipetting nozzle in the second pipetting arm,
the innermost cylinder is relatively displaced in an axial direction while relatively rotating with respect to the outermost cylinder, and
the arm-side fixing part is provided at a position eccentric from a central axis of the expansion/contraction part, and the expansion/contraction part is at a position circumferentially different between a most contracted state and a most expanded state.

6. The camera holding device for an automatic analysis apparatus according to claim 5, wherein male screws are provided at upper ends of the first mounting member and the second mounting member, and the first mounting member and the second mounting member are fastened to female screws provided on bottom surfaces of the first pipetting arm and the second pipetting arm.

7. The camera holding device for an automatic analysis apparatus according to claim 3, wherein
the outermost cylinder includes a pair of first extensions extending in an expansion/contraction direction of the expansion/contraction part,
the innermost cylinder includes a pair of second extensions extending in the expansion/contraction direction of the expansion/contraction part,
a height from a bottom surface of the hole of the arm-side fixing part to an upper end of the first extension is longer than a protrusion amount of the first mounting member from a bottom surface of the first pipetting arm and is shorter than an expansion/contraction amount of the expansion/contraction part,
a height from the bottom surface of the hole of the arm-side fixing part to an upper end of the second extension is shorter than the protrusion amount of the first mounting member from the bottom surface of the first pipetting arm and longer than a protrusion amount of the second mounting member from a bottom surface of the second pipetting arm,
in a state where the expansion/contraction part is most contracted, the first extensions protrude the most upward and grip side surfaces of the first pipetting arm, and
in a state where the expansion/contraction part is most expanded, the second extensions protrude most upward and grip side surfaces of the second pipetting arm.

8. The camera holding device for an automatic analysis apparatus according to claim 3, wherein
the automatic analysis apparatus includes a third pipetting arm that moves a third pipetting nozzle longer than the first pipetting nozzle and shorter than the second pipetting nozzle through rotational movement, and a third mounting member protruding downward from a bottom surface of the third pipetting arm,
the expansion/contraction part includes the innermost cylinder, the outermost cylinder, and an intermediate cylinder disposed between the innermost cylinder and the outermost cylinder, and pressure between the intermediate cylinder and the innermost cylinder is smaller than pressure between the intermediate cylinder and the outermost cylinder, and
the camera that captures an image of the third pipetting nozzle is held by the third pipetting arm by fitting the hole of the arm-side fixing part to the third mounting member in a state where only the innermost cylinder is most expanded.

* * * * *